(12) United States Patent
Takaki

(10) Patent No.: US 6,628,732 B1
(45) Date of Patent: Sep. 30, 2003

(54) RECEIVED POWER CALCULATING METHOD AND MOBILE STATION

(75) Inventor: Tetsuya Takaki, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/353,750

(22) Filed: Jul. 14, 1999

(30) Foreign Application Priority Data

Jul. 17, 1998 (JP) .......................................... 10-202564

(51) Int. Cl.⁷ .............................................. H04L 27/08
(52) U.S. Cl. ...................... 375/345; 375/146; 375/227; 375/340; 370/342; 455/522
(58) Field of Search ................ 375/345, 340, 375/227, 146; 370/342, 335; 455/522

(56) References Cited

U.S. PATENT DOCUMENTS 5,982,763 A * 11/1999 Sato ........................ 370/342
6,028,894 A * 2/2000 Oishi et al. ................. 375/227
6,094,585 A * 7/2000 Dajer et al. ................. 455/522
6,144,860 A * 11/2000 Komatsu ..................... 455/522

FOREIGN PATENT DOCUMENTS

| JP | 8-168075 | 6/1996 |
|----|----------|--------|
| JP | 9-261162 | 10/1997 |
| JP | 10-32540 | 2/1998 |
| JP | 10-66139 | 3/1998 |

* cited by examiner

Primary Examiner—Shuwang Liu
(74) Attorney, Agent, or Firm—Dickstein, Shapiro, Morin & Oshinsky, LLP.

(57) ABSTRACT

A radio portion controlling means of a receiver of a mobile station has an average time setting means. A controlling means supervises an average received power. When the average received power approaches a power at which the gain of a gain changing means should be changed, the controlling means causes a received power calculating means to increase the time period for the calculation of the average received power so as to decrease the error of the average received power at which the gain of the gain selecting means is changed.

8 Claims, 4 Drawing Sheets

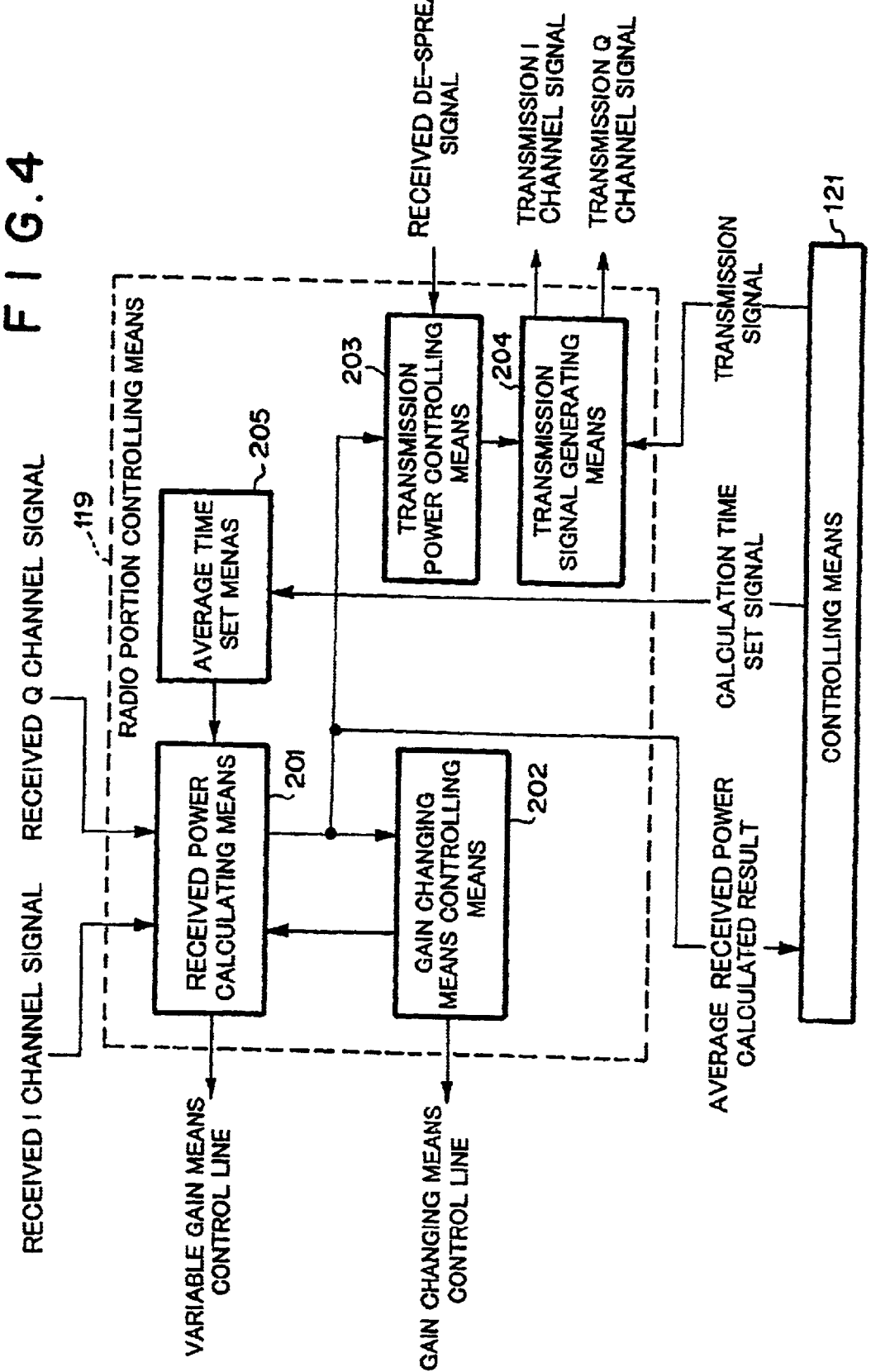

RECEIVED POWER CALCULATING METHOD AND MOBILE STATION

BACKGROUND OF THE INVENTION

1. Field of the Invention

The present invention relates to a mobile communication system, in particular, to a received power calculating method of a receiver of a radio portion of a mobile communication system, the receiver calculating a received power and controlling a down-link transmission power of a base station.

2. Description of the Related Art

In the CDMA (Code Division Multiple Access) system, when a base station spreads a spectrum of a transmission signal with a plurality of predetermined codes and communicates with mobile stations using the spread signal, the same frequency band can be assigned to a plurality of subscribers or channels. Thus, frequencies can be effectively used. In the CDMA system, when a receiver receives a spread spectrum signal from the base station, unless the receiver de-spreads the spread spectrum signal with the same code at the same timing, the receiver cannot extract the original transmission signal. Thus, the bit error rate of the received signal deteriorates.

In the CDMA system, a high power transmission signal transmitted from a transmitter disposed in a near location interferes with a weak transmission signal transmitted from a transmitter disposed in a far location. Such a problem is referred to as location problem.

To alleviate such a problem, it is necessary to accurately and widely control a transmission power.

Generally, a transmission power control signal can be generated with the average received power. When a mobile station controls the transmission power of a base station, if the received power calculated by the mobile station is lower than a predetermined threshold value defined in the system, the received power becomes information that causes the transmission power to increase. The information is transmitted from the mobile station to the base station. Thus, the information causes the base station to increase the transmission power by, for example, dB.

On the other hand, when the received power calculated by the mobile station is higher than the predetermined threshold value defined in the system, the received power becomes information that causes the base station to decrease the transmission power. The information is transmitted from the mobile station to the base station. Thus, the information causes the base station to decrease the transmission power by dB.

After the transmission power is controlled, the average received power converges on the threshold value in a predetermined time period.

A receiver of a conventional mobile station has a gain changing means and a variable gain amplifying means. The gain changing means and the variable gain amplifying means are disposed upstream of a frequency converting means that converts a radio frequency signal into an intermediate frequency signal. The gain changing means selects a radio frequency amplifying means or an attenuating means so as to prevent the frequency converting means from operating in the saturation region. The variable gain amplifying means controls the gain so that an input power to an analog-digital converting means (A/D converting means) that converts an analog signal of the received signal into a digital signal becomes constant. When the received power at an antenna is relatively high, the gain of the gain changing means is changed so as to prevent the frequency converting means from operate in the saturation region. When the gain of the gain changing means is changed, a control amount corresponding to a gain variation amount of the gain changing means is placed in a gain control signal of the variable gain amplifying means so as to keep the input power of the A/D converting means constant.

To control the transmission power of the base station, the received power is converted into a digital signal by the A/D converting means. The average received power in a predetermined time period is calculated. Corresponding to the calculated result, the transmission power of the base station is controlled.

FIG. 1 is a block diagram showing the structure of a conventional mobile station. Referring to FIG. 1, the mobile station has an antenna 101, an duplexer means 102, a first radio frequency amplifying means 103, a first band pass filter means 104, a gain changing means 105, a second band pass filter means 108, a first local signal oscillating means 110, a frequency converting means 109, a channel filter means 111, a variable gain means 112, a second local signal oscillating means 113, an quadrature demodulating means 114, low pass filter means 115 and 116, analog/digital (A/D) converting means 117 and 118, a digital signal processing means 120, a radio portion controlling means 119', a transmitting means 122, and a controlling means 121'. The duplexer means 102 separates a transmission signal from a received signal. The gain changing means 105 has an attenuating means 106 and a second radio frequency amplifying means 107. The frequency converting means 109 converts a radio frequency signal into an intermediate frequency signal with a first local oscillation signal of the first local signal oscillating means 110. The channel filter means 111 separates a desired channel from the received signal. The quadrature demodulating means 114 converts the intermediate frequency signal into a base band signal with a second local oscillation signal oscillated by the second local signal oscillating means 113 and a signal phase-shifted by a 90° phase shifter, quadrature demodulates the base band signal, and outputs an I channel signal and a Q channel signal. The low pass filter means 115 and 116 pass only base band signals that have been quadrature demodulated.

The digital signal processing means 120 receives the I channel signal and the Q channel signal, performs a de-spreading process, an error-correcting process, and so forth for the I channel signal and the Q channel signal, and supplies the de-spread signals to the radio portion controlling means 119'. The radio portion controlling means 119' receives the I channel signal and the Q channel signal, outputs signals that control the gain changing means 105 and the variable gain means 112, and outputs a transmission signal.

FIG. 2 is a block diagram showing the structure of the radio portion controlling means 119'. Referring to FIG. 2, the radio portion controlling means 119' has a received power calculating means 401, a gain changing means controlling means 402, a transmission power controlling means 403, and a transmission signal generating means 404. The received power calculating means 401 calculates the average power of the I and Q channel signals received from the A/D converting means 117 and 118 in a predetermined time period, controls the variable gain means 112 so that the powers of the signals supplied to the A/D converting means 117 and 118 become constant. Further, the received power calculating means 401 supplies the calculated results to the transmission power controlling means 403, the gain changing means controlling means 402, and the controlling means 121. The gain changing means controlling means 402 compares a threshold value of the received power at the antenna means 102 with the average power calculated from the received power calculating means 401 and generates a gain selection control signal of the gain changing means 105 so as to prevent the frequency converting means 109 from operating in the saturation region. The transmission power controlling means 403 calculates the power of the received channel with the average received power value received from the received power calculating means 401 and the de-spread received signal received from the digital signal processing means 120. When the power of the received channel is lower than a predetermined threshold value, the transmission power controlling means 403 generates a control signal that causes the base station to increase the transmission power. In contrast, when the power of the received channel is higher than the predetermined threshold value, the transmission power controlling means 403 generates a control signal that causes the base station to decrease the transmission power. The transmission signal generating means 404 places the transmission power control signal on the transmission signal received from the controlling means 121 and generates transmission I and Q signal components.

In the receiver of the mobile station, the gain changing means 105 is disposed upstream of the frequency converting means 109. The gain changing means 105 selects the attenuating means 106 or the second radio frequency amplifying means 107 corresponding to the received power so as to prevent the frequency converting means 109 that converts a radio frequency signal with a relatively high received power into an intermediate frequency signal from operating in a nonlinear region.

The variable gain means 112 causes the powers of the input signals to the A/D converting means 117 and 118 against the received power that largely varies to be kept constant.

Next, the operation of the mobile station shown in FIG. 1 will be described. When the received power of the mobile station is low, the second radio frequency amplifying means 107 of the gain changing means 105 is used. The received power calculating means 401 of the radio portion controlling means 119 calculates an average received power in each time period t with the received signal, controls the gain of the variable gain means 112, and supplies the average received power at the end of the antenna corresponding to the calculated average received power to the transmission power controlling means 403.

The transmission power controlling means 403 generates transmission power control information for the base station. The transmission signal generating means 404 places transmission power control information on transmission data and transmits the resultant signal to the base station through the transmitting means 122 and the antenna 101.

When the received power becomes relatively high, the attenuating means 106 of the gain selecting means 105 is used so as to prevent the frequency converting means 109 from operating in the non-linear region. When the gain is attenuated, the gain of the variable gain means 112 is increased for the difference between the gain of the high frequency amplifying means 107 and the gain of the attenuating means 106. The received power calculating means 401 calculates the average received power in each time period t so as to control the gain of the variable gain means 112.

Considerations for the Invention

However, in the receiver of the conventional mobile station, when the timing at which the gain of the gain changing means 105 is changed does not match the timing at which the gain of the variable gain means 112 is varied, the received power in the time period between the timing at which the gain of the gain changing means 105 is changed and the timing at which the gain of the variable gain means 112 is varied supplied as a low power corresponding to the gain attenuated by the attenuating means 106 of the gain changing means 105 to the received power calculating means 401. The average received power calculated in each time period t becomes lower than the real power. Thus, the transmission power controlling means 403 malfunctions. When the received power at the end of the antenna becomes large and thereby the gain of the gain changing means varies, if the timing at which the gain is changed does not match the timing at which the gain of the variable gain means is varied, the calculated value of the average received power has an error such as a phase error. Thus, the base station transmits an incorrect power control signal to the base station. Consequently, when the incorrect transmission power control signal causes the base station to increase the transmission power, the received interference powers of other subscribers increase and thereby bit error rate of other subscribers deteriorates.

In addition, when the base station decreases the transmission power due to an incorrect transmission power control signal, the local received interference power increases and thereby the local bit error rate deteriorates.

SUMMARY OF THE INVENTION

The present invention is made from the above-described point of view. An object of the present invention is to provide a mobile station that allows the average received power at the end of an antenna to be accurately calculated and thereby the transmission power of a base station to be accurately controlled even if the timing at which the gain of a gain changing means is changed does not match the timing at which the gain of a variable gain means is varied. Another object of the present invention is to provide a received power calculating method that allows an error of the average received power at which the gain is changed to decrease.

To accomplish the above-described objects, a radio portion controlling means of a receiver of a mobile station has an average time setting means. A controlling means supervises the average received power. When the average received power approaches a power at which the gain of the gain changing means should be changed, the controlling means causes a received power calculating means to increase a calculation time period for a calculation of the average received power so as to decrease the error of the average received power at which the agin of a gain changing means is changed.

An aspect of the present invention is a received power calculating method for a receiver of a mobile station for calculating an average received power and controlling a transmission power of a base station with the calculated average received power, the receiver having a gain changing means for selecting radio frequency amplifying means or attenuating means so as to prevent frequency converting means for converting a radio frequency signal into an intermediate frequency signal from operating in a saturation region, a variable gain means, disposed upstream of converting means for converting the intermediate frequency signal into a base band signal and quadrature demodulating the base band signal, for keeping the power of an quadrature demodulated signal constant, the quadrature demodulated signal being supplied to A/D converting means for converting the quadrature demodulated signal as an analog signal into a digital signal, a received power calculating means for calculating the average power of a signal received from antenna means so as to control the gain of the variable gain means, a gain changing means controlling means for controlling the gain of the changing means, a transmission power controlling means for generating a control signal that causes the base station to increase the transmission power when the power of the received channel is lower than a predetermined threshold value and for generating a control signal that causes the base station to decrease the transmission power when the power of the received channel is higher than the predetermined threshold value, and a transmission signal generating means for generating a signal that causes the transmission power controlling means to transmit the control signal to the base station, the received power calculating method, comprising the steps of supervising the average received power, and causing the received power calculating means to increase the time period for a calculation of the average received power when the average received power approaches a power at which the gain of the gain changing means should be changed so as to decrease the error of the average received power at which the gain of the gain selecting means is changed.

When the average power of the received signal of the antenna means approaches a value at which the gain of the gain changing means should be changed, the average time period in which the received power is calculated is increased so as to decrease the calculation error of the received power at which the gain of the gain changing means is changed.

The average time setting means decrease the error of the calculated result of the received power calculating means at which the gain of the gain changing means is changed so as to prevent the transmission power controlling means from malfunctioning. Thus, the received power of the mobile station can be accurately calculated. The transmission power of the base station can be accurately controlled. Thus, the bit error rate due to interference from other subscribers can be prevented from deteriorating. In addition, the interference to other subscribers can be prevented.

Referring to FIGS. 3 and 4, the gain changing means controlling means (202) has a predetermined threshold value of a received power at the antenna means of which the frequency converting means (109) operates in the saturation region. The gain changing means controlling means (202) compares the average received power received from the received power calculating means (201) with the threshold value. When the average received power exceeds the threshold value, the gain changing means controlling means (202) supplies a gain change control signal to the gain changing means (105). When the gain changing means (105) receives the gain change control signal, the gain of the gain changing means (105) is changed. When the gain changing means (105) supplies a gain change signal to the received power calculating means (201), it adds a control amount corresponding to a variation amount of the gain of the gain changing means (105) to the gain control signal of the variable gain means (112) so as to control the gain of the variable gain means (112).

Likewise, the controlling means (121) has a predetermined threshold value of a received power of the antenna means of which the frequency converting means (109) operates in the saturation region. When the controlling means (121) receives the average received power from the received power calculating means (201), the controlling means (121) compares the threshold value with the average received power. When the average received power is a value in the vicinity of the threshold value, the controlling means (121) generates a control signal that causes the average time setting means (205) to increase the time period for a calculation of the received power and supplies the control signal to the average time setting means (205). Thus, the average time setting means (205) sets a longer time period than the initial set value as the time period for the calculation of the received power to the received power calculating means (201).

When the average received power received from the received power calculating means (201) largely deviates from the threshold value, the controlling means (121) sets the initial value for the time period for the calculation of the received power to the average time setting means (205) so that the received power calculating means (201) calculates the received power with the initial set value.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 4 is a block diagram showing the structure of a radio portion controlling means of the receiver of the mobile station according to the embodiment of the present invention.

DESCRIPTION OF PREFERRED EMBODIMENT

Figure 1:
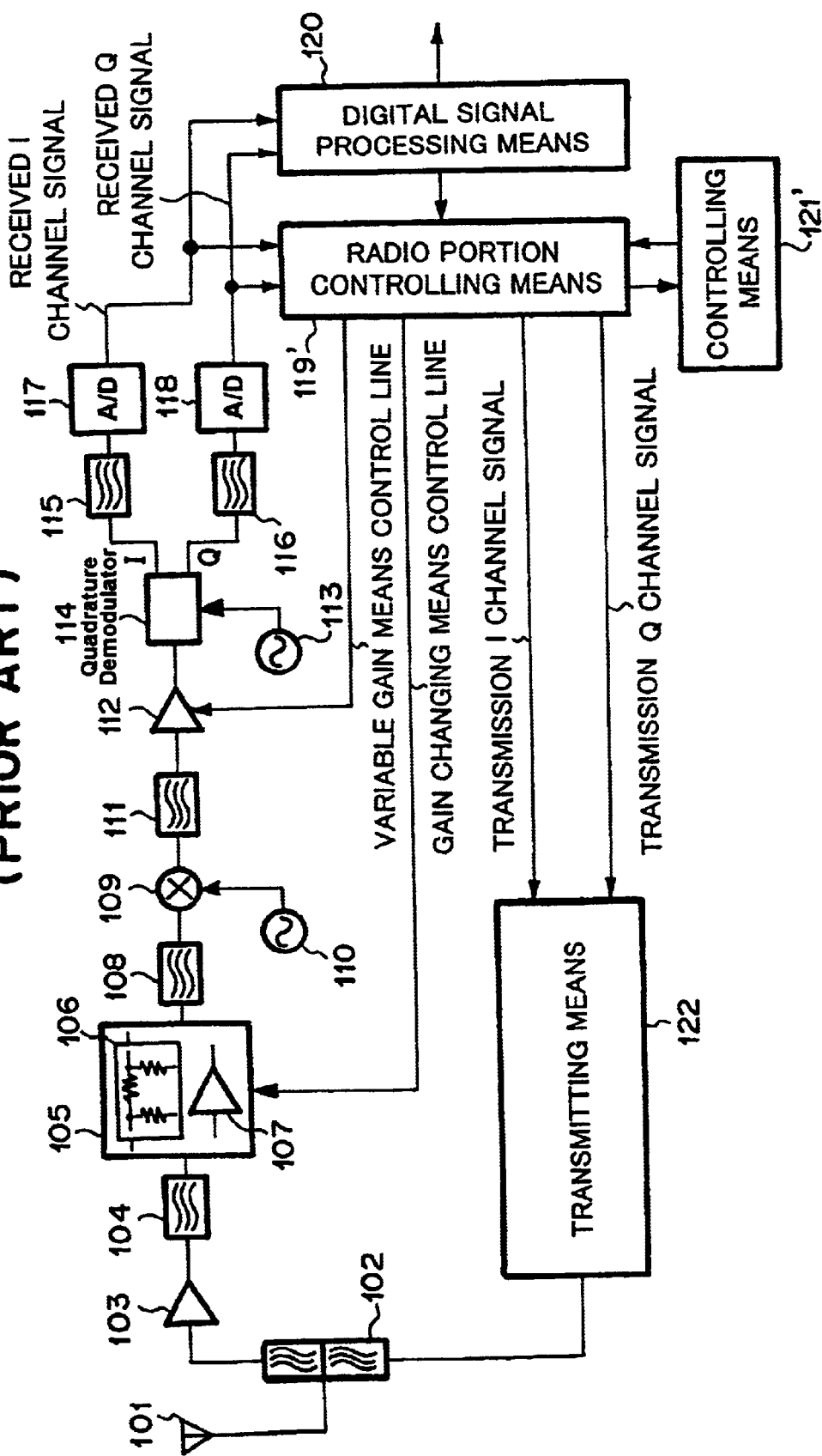
FIG. 1 is a block diagram showing the structure of a receiver of a conventional mobile station.
Figure 2:
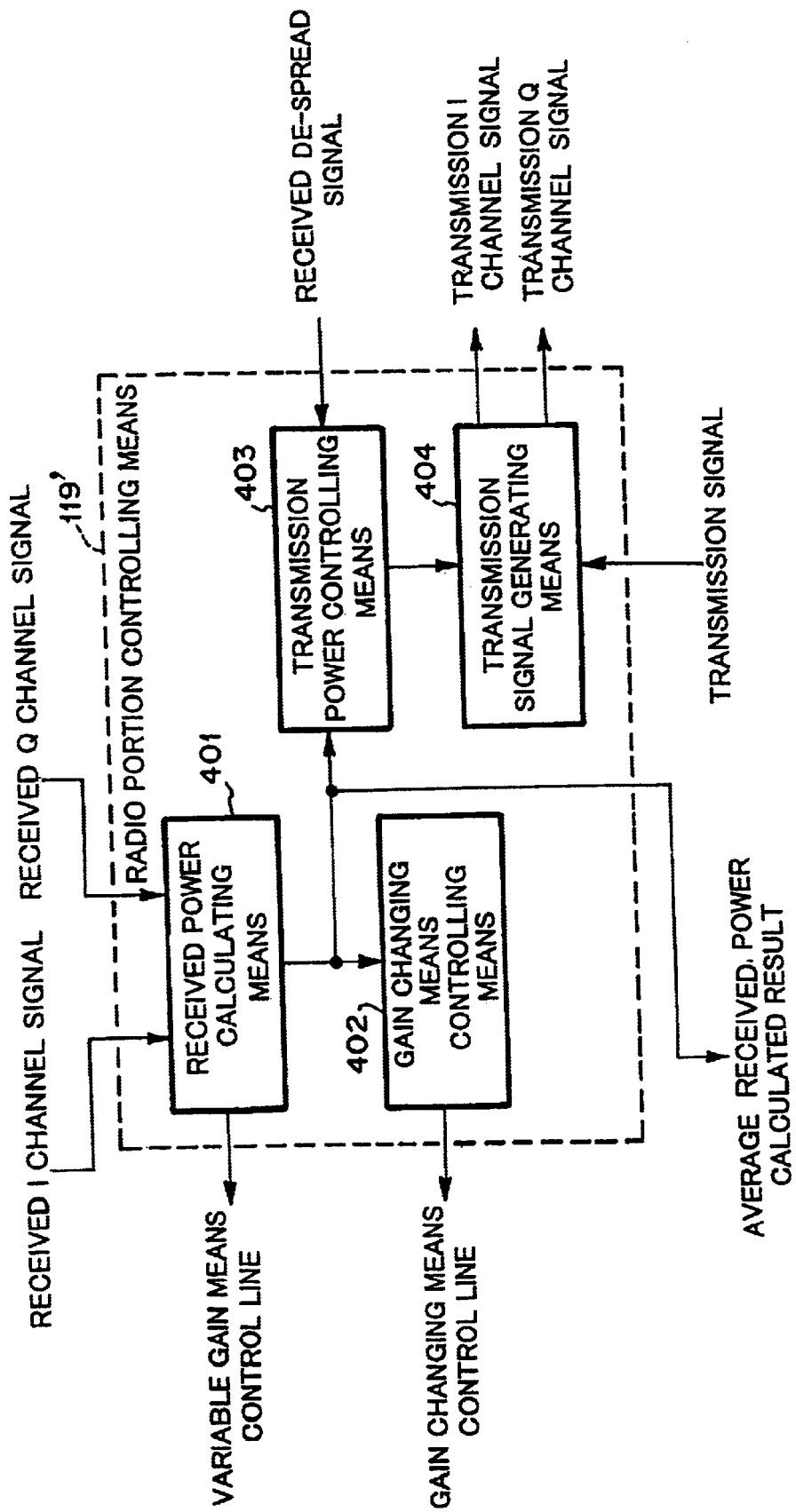
FIG. 2 is a block diagram showing the structure of a radio portion controlling means of the receiver of the conventional mobile station.
Figure 3:
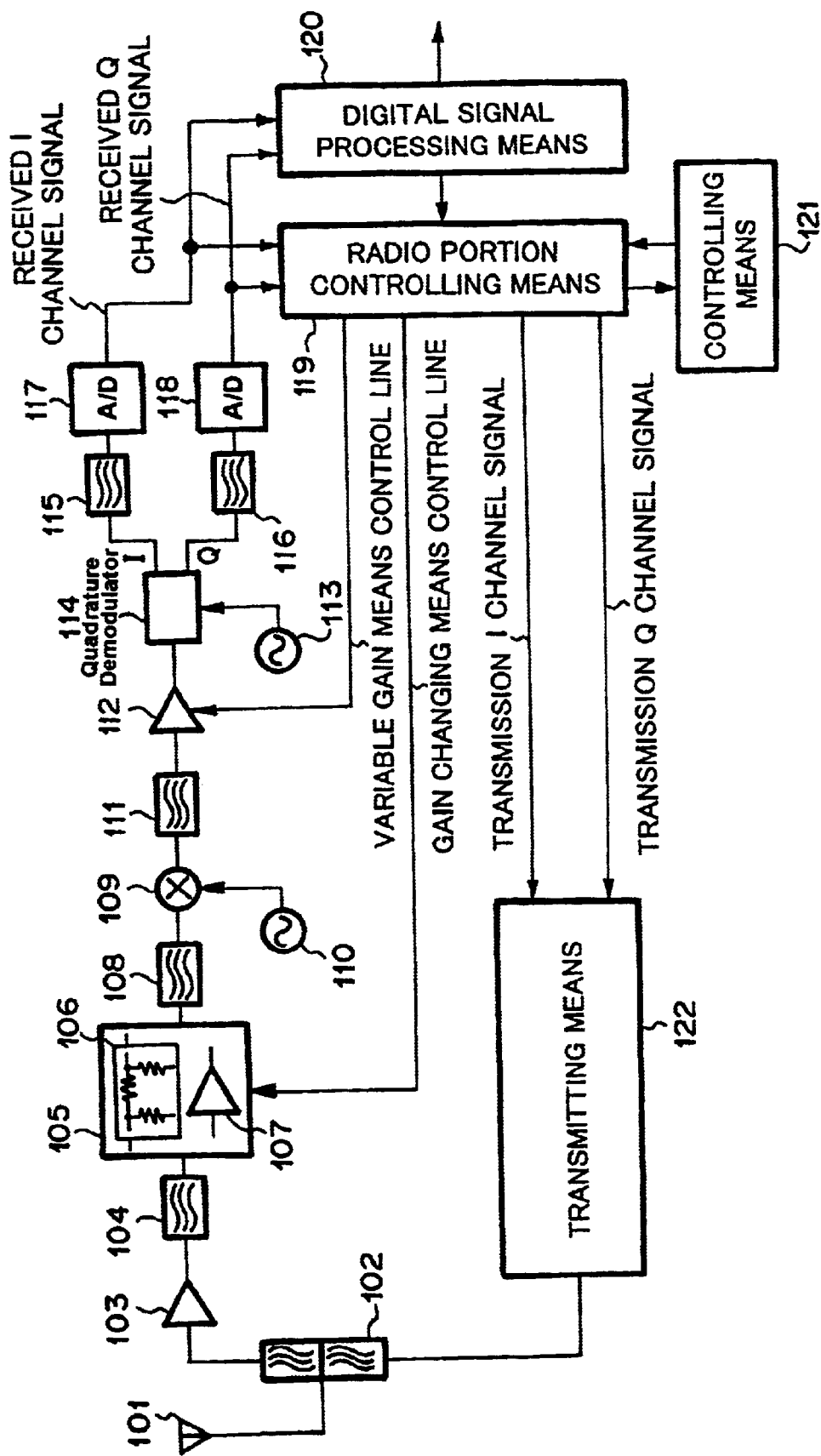
FIG. 3 is a block diagram showing the structure of a receiver of a mobile station according to an embodiment of the present invention.

FIG. 3 is a block diagram showing the structure of a mobile station according to an embodiment of the present invention. FIG. 4 is a block diagram showing the structure of a radio portion controlling means according to the embodiment of the present invention.

Referring to FIG. 3, the mobile station has an antenna means 101, an duplexer means 102, a first radio frequency amplifying means 103, a first band pass filter means 104, a gain changing means 105, a second band pass filter means 108, a first local signal oscillating means 110, a frequency converting means 109, a channel filter means 111, a variable gain means 112, a second local signal oscillating means 113, an quadrature demodulating means 114, low pass filter means 115 and 116, A/D converting means 117 and 118, a radio portion controlling means 119, a digital signal processing means 120, a transmitting means 122, and a controlling means 121. The duplexer means 102 separates a transmission signal from a received signal. The gain changing means 105 has a second radio frequency amplifying means 107 and an attenuating means 106. The first local signal oscillating means 110 oscillates a first local signal used to convert a radio frequency signal to an intermediate frequency signal. The frequency converting means 109 converts the radio frequency signal into the intermediate frequency signal with the first local oscillation signal oscillated by the first local signal oscillating means 110. The channel filter means 111 selects a received channel from the received signal. The second local signal oscillating means 113 oscillates a second local oscillation signal used to convert the intermediate frequency signal into a base band signal. The quadrature demodulating means 114 converts the intermediate frequency signal into the base band signal with the second local oscillation signal oscillated by the second local signal oscillating means 113, quadrature demodulates the resultant signal, and outputs an I channel signal and a Q channel signal. The low pass filter means 115 and 116 pass only the quadrature demodulated base band signals. The A/D converting means 117 and 118 convert the I channel signal and the Q channel signal as analog signals into digital signals. The radio portion controlling means 119 controls the gain changing means 105 of the variable gain means 112. The digital signal processing means 120 performs a de-spreading process, an error-correcting process, and so forth for the I channel signal and the Q channel signal. The transmitting means 122 performs a radio process for the transmission data.

Referring to FIG. 4, the radio portion controlling means 119 has a received power calculating means 201, an average time setting means 205, a gain changing means controlling means 202, a transmission power controlling means 203, and a transmission signal generating means 204. The received power calculating means 201 calculates the average received power with output signals of the A/D converting means 117 and 118 so as to control the gain of the variable gain means 112.

The received power calculating means 201 is connected to the average time setting means 205, the gain changing means controlling means 202, the transmission power controlling means 203, and the digital signal processing means 120.

The received power calculating means 201, the average time setting means 205, and the transmission signal generating means 204 are connected to the controlling means 121 so as to exchange control signals therebetween.

A control signal output terminal of the received power calculating means 201 is connected to a control signal input terminal of the variable gain means 112. The gain of the variable gain means 112 is controlled with a control signal generated by the received power calculating means 201 so that the received powers supplied to the A/D converting means 117 and 118 become constant.

A control signal output terminal of the gain changing means controlling means 202 is connected to a control signal input terminal of the gain changing means 105. An output terminal of the transmission signal generating means 204 is connected to an input terminal of the transmitting means 122.

In the mobile station according to the embodiment of the present invention, the average time setting means 205 that sets the average time period for a calculation of the received power to the received power calculating means 201 that calculates the average power of the signal received from the antenna means 101. When the average power of the received signal of the antenna means 101 approaches a value at which the gain of the gain changing means 105 should be changed, the average time setting means 205 increases the average time period for the calculation of the received power so as to decrease the calculation error of the received power at which the gain of the gain changing means 105 is changed.

The average time setting means 205 decreases the calculation error of the received power calculating means 201 at which the gain of the gain changing means 105 is changed so as to prevent the transmission power controlling means 203 from malfunctioning.

Thus, the received power of the mobile station can be accurately calculated. Consequently, the transmission power of the base station can be accurately controlled. As a result, the bit error rate due to the interference from other subscribers can be prevented from deteriorating. In addition, the interference to other subscribers can be prevented.

Next, the operation of the embodiment will be described. A signal transmitted from a base station (not shown) is received by the antenna means 101. The received signal is supplied to the first radio frequency amplifying means 103 through the duplexer means 102. The first radio frequency amplifying means 103 amplifies the received signal. The resultant signal is supplied to the gain changing means 105 through the first band pass filter means 104. When the received power is low, the second radio frequency amplifying means 107 of the gain changing means 105 is used. In contrast, when the received power is so high as the frequency converting means 109 operates in the saturation region, the attenuating means 106 of the gain changing means 105 is used. Thus, the received signal is processed by the second radio frequency amplifying means 107 or the attenuating means 106. The output signal of the gain changing means 105 is supplied to the frequency converting means 109 through the second band pass filter means 108. The frequency converting means 109 converts the radio frequency signal into the intermediate frequency signal with the first local oscillation signal oscillated by the first local signal oscillating means 110. An output signal of the frequency converting means 109 is supplied to the variable gain means 112 through the channel filter means 111. The variable gain means 112 varies the gain of the received signal. An output signal of the variable gain means 112 is supplied to the quadrature demodulating means 114. The quadrature demodulating means 114 converts the intermediate frequency signal into a base band signal with the second local oscillation signal oscillated by the second local signal oscillating means 113, quadrature demodulates the base band signal, and outputs an I channel signal and a Q channel signal. The I channel signal and the Q channel signal are supplied to the A/D converting means 117 and 118 through the low pass filter means 115 and 116, respectively. The low pass filter means 115 and 116 converts the I channel signal and the Q channel signal as analog signals into digital signals, respectively. The digital signals are supplied to the received power calculating means 201 (of the radio portion controlling means 119) and the digital signal processing means 120.

The digital signal processing means 120 de-spreads the received signals, performs digital signal processes such as an error-correcting process, and supplies the resultant signals to the transmission power controlling means 203.

The received power calculating means 201 calculates the average power of the received signals in a constant time period t and controls the variable gain means 112 so that the powers of the signals supplied to the A/D converting means 117 and 119 become constant. In addition, the received power calculating means 201 supplies the calculated results to the transmission power controlling means 203, the gain changing means controlling means 202, and the controlling means 121.

The gain changing means controlling means 202 has a predetermined threshold value of the received power of the antenna means 101 so as to prevent the frequency converting means 109 from operating in the saturation region. The gain changing means controlling means 202 compares the threshold value with the average received power received from the received power calculating means 201 and generates a gain change control signal for the gain changing means 105.

The transmission power controlling means 203 calculates the power of the received channel with the average received power received from the received power calculating means 201 and the de-spread received signals received from the digital signal processing means 120. When the power of the received channel is lower than the threshold value, the transmission power controlling means 203 generates a control signal that causes the base station to increase the transmission power. In contrast, when the power of the received channel is higher than the threshold value, the transmission power controlling means 203 generates a control signal that causes the base station to decrease the transmission power. The generated control signal is supplied to the transmission signal generating means 204. The transmission signal generating means 204 places the control signal on the transmission signal. The transmitting means 122 performs a radio process for the transmission signal. The resultant signal is transmitted to the base station through the antenna means 101.

The controlling means 121 compares the average received power received from the received power calculating means 201 with the threshold value of the received power. When the average received power approaches the threshold value, the controlling means 121 causes the received power calculating means 201 to increase the time period for the calculation of the received power through the average time setting means 205.

Next, the operations of the radio portion controlling means 119, the digital signal processing means 120, and the controlling means 121 will be described.

The controlling means 120 sets a time period t as an initial value to the average time setting means 205 so that the received power calculating means 201 calculates the average received power in the time period t.

The digital signals are supplied from the A/D converting means 117 and 118 to the received power calculating means 201 and the digital signal processing means 120.

The digital signal processing means 120 performs a de-spreading process and an error-correcting process for the received signals and supplies the de-spread signals to the transmission power controlling means 203.

The received power calculating means 201 calculates the average received power in the time period t as the initial value, controls the gain of the variable gain means 112, and supplies the calculated result in each time period t to the gain changing means controlling means 202 and the controlling means 121.

The gain changing means controlling means 202 controls the gain of the variable gain means 112 by comparing the reference value of the gain changing means controlling means 202 with the average power value. When the average power value is lower than the reference value, the gain changing means controlling means 202 generates a control signal that causes the variable gain means 112 to increase the gain. When the average power value is higher than the reference value, the gain changing means controlling means 202 generates a control signal that causes the variable gain means 112 to decrease the gain.

Whenever the received power calculating means 120 calculates the average power, the gain changing means controlling means 202 controls the gain of the variable gain means 112.

The gain changing means controlling means 202 has a threshold value of the received power of the antenna means 101 at which the frequency converting means 109 operates in the saturation region. The gain changing means controlling means 202 compares the threshold value with the average received power. When the average power exceeds the threshold value, the gain changing means controlling means 202 generates a control signal that causes the gain to be changed and supplies the control signal to the gain changing means 105 and the received power calculating means 201.

When the gain changing means 105 receives the gain change control signal, the gain changing means 105 changes the gain. When the gain change control signal is supplied to the gain changing means 105, the received power calculating means 201 adds a control amount corresponding to a variation amount of the gain of the gain changing means 105 to the gain control signal of the variable gain means 112 so as to control the gain of the variable gain means 112.

As with the gain changing means controlling means 202, the controlling means 121 has a predetermined threshold value of the received power of the antenna means 101 at which the frequency converting means 109 operates in the saturation region. When the controlling means 121 receives the average value from the received power calculating means 201, the controlling means 121 compares the threshold value with the average power. When the average power is a value in the vicinity of the threshold value, the controlling means 121 generates a control signal that causes the average time setting means 205 to increase the time period for the calculation of the received power and supplies the control signal to the average time setting means 205.

When the controlling means 121 supplies the control signal to the average time setting means 205, it sets a time period T that is longer than the time period t for the calculation of the received power to the received power calculating means 201.

Since the operations of the received power calculating means 201 and the gain changing means 105 are performed in parallel with the operation of the controlling means 121, the calculation error of the average received power at which the gain of the gain changing means 105 is changed decreases.

When the average power received from the controlling means 121 largely deviate from the vicinity of the threshold value, the controlling means 121 causes the average time setting means 205 to set the time period t for the calculation of the received power to the received power calculating means 201. When the threshold value of the average power is −40 dBm, the vicinity thereof is around 3 dB. When the time period for the calculation of the received power is 0.62 msec (namely, t=0.62 msec), the longer time period T may be 2t=1.24 msec, 4t=2.48 msec, or 8t=4.96 msec.

Corresponding to the above-described operation, the transmission power controlling means 203 calculates the power of the received channel with the average received power and the de-spread received signals. When the power of the received channel is lower than the reference value of the channel power, the transmission power controlling means 203 generates a control signal that causes the base station to increase the transmission power. In contrast, when the calculated power of the received channel is higher than the reference value, the transmission power controlling means 203 generates a control signal that causes the base station to decrease the transmission power.

The generated control signal is supplied to the transmission signal generating means 204. The control signal is placed on the transmission signal. The resultant signal is transmitted to the base station through the antenna means 101.

In the above-described embodiment, the transmitting and receiving functions of the mobile station were described.

However, when the present invention is applied for a base station that has a plurality of receiving portions and a plurality of demodulating portions, the transmission power can be accurately controlled.

As described above, according to the present invention, the gain of the gain changing means is changed. When the gain of the variable gain means is varied, the received power can be accurately calculated. Thus, the transmission power of the base station can be accurately controlled.

In other words, according to the present invention, when the gain of the gain changing means is changed and the gain of the variable gain means is varied, the time period for the calculation of the received power is varied so as to prevent an error from taking place. The timing at which the calculated received power is supplied to the transmission power controlling means is supervised. Before the gain of the gain changing means is changed and the gain of the variable gain means is varied, the time period for the calculation of the received power is controlled.

Thus, according to the present invention, the bit error rate of the local mobile station can be prevented from deteriorating against interference wavers of other subscribers. In addition, the interference power of the local mobile station to other subscribers can be minimized. Thus, the bit error rate of other subscribers can be suppressed from deteriorating.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A method by which a mobile station controls a transmission power of a base station, the method comprising:
    setting a threshold value for the mobile station that represents a signal power level at which a frequency converter at the mobile station to which a signal is applied would operate in a saturation region;
    calculating an average power of a signal received by the mobile station's antenna;
    attenuating a power level of the received signal, when the calculated average power of the received signal is lower than the threshold value, and amplifying the power level of the received signal by the mobile station if the calculated average power of the received signal is higher than the threshold value;
    increasing the time period for calculating an average received power of the received signal when the calculated average received power approaches the threshold value;
    calculating a power level of a received channel based on the calculated average received power and despread received signals; and
    generating and transmitting a first control signal based on the power level of the received channel, such that when the power level of the received channel is lower than the threshold level the first control signal causes the base station to increase its transmission power, and when the power level of the received channel is higher than the threshold level the first control signal causes the base station to decrease its transmission power.

2. The method as set forth in claim 1, comprising comparing the calculated average received power of the received signal with the threshold value and generating a second control signal that causes a gain changing circuit to change a gain of the received signal by switching between an attenuator and an amplifier.

3. The method as set forth in claim 2, comprising:
    changing the gain when the gain changing circuit receives the second control signal;
    controlling the gain of a variable gain circuit when the gain changing circuit receives the second control signal;
    monitoring the average received power; and
    increasing the time period for the calculation of the received power when the average received power is within a predetermined range of the threshold value.

4. A mobile station that calculates an average received power of a signal received by the mobile station, and controls a transmission power of a base station based on the calculated average received power, the mobile station comprising:
    a gain changing circuit that selects either a radio frequency amplifier or an attenuator, the selection preventing a first frequency converter from operating in a saturation region, wherein the first frequency converter converts a radio frequency signal into an intermediate frequency signal;
    a variable gain circuit disposed upstream of a second frequency converter, the second frequency converter converting the intermediate frequency signal into a base band signal and quadrature demodulating the base band signal, the variable gain circuit keeping the power of the quadrature demodulated signal constant, the quadrature demodulated signal being supplied to an A/D converter that converts the quadrature demodulated signal from an analog signal into a digital signal;
    a radio portion controller including:
        a received power calculator that calculates the average received power so as to control a gain of the variable gain circuit;
        a gain changing circuit controller that controls the gain changing circuit;
        a transmission power controller that generates a first control signal that (i) causes the base station to increase transmission power when a power of a received channel is lower than a predetermined threshold value, and that (ii) causes the base station to decrease the transmission power when the power of the received channel is higher than the predetermined threshold value;
        a transmission signal generator that transmits the first control signal to the base station; and
        an average time setting circuit that sets an average time period for a calculation of the received power to the received power calculator; and
    a time setting controller that receives the average received power from the received power calculator, compares the average received power with the predetermined threshold value of the received power, and causes the average time setting circuit to change the average time period for the calculation of the received power when the average received power approaches a value within a predetermined range of the threshold value.

5. The mobile station as set forth in claim 4, wherein:
    the threshold value is a value at which the first frequency converter operates in the saturation region; and
    the gain changing circuit controller compares the threshold value with the average received power received from the received power calculator, generates a second control signal when the average received power exceeds the threshold value, and supplies the second control signal to the gain changing circuit.

6. The mobile station as set forth in claim 5, wherein:

the gain changing circuit changes the gain when the gain changing circuit receives the second control signal; and the received power calculator generates a third control signal that it sends to the variable gain circuit so as to control the gain of the variable gain circuit when the gain changing circuit receives the second control signal.

7. The mobile station as set forth in claim 6, wherein the time setting controller monitors the average received power, the time setting controller comparing the average received power received from the received power calculator with the threshold value, and when the average received power reaches a value within a predetermined range of the threshold value, the time setting controller causes the received power calculator to increase the time period for the calculation of the received power.

8. The mobile station as set forth in claim 7, wherein the time setting-controller causes the average time setting circuit to restore the time period for the calculation of the received power to an initial value so that the received power calculator operates in an initial operation state when the average received power received from the received power calculator deviates from a value within the predetermined range of the threshold value.

* * * * *